United States Patent
Su et al.

(10) Patent No.: US 7,714,463 B2
(45) Date of Patent: May 11, 2010

(54) DEVICE FOR CONTROLLING SINGLE-PHASE POWER CONDITIONER FOR RENEWABLE ENERGY SYSTEM

(75) Inventors: Wei-Te Su, Miaoli County (TW);
Pao-Chuan Lin, Hsinchu County (TW);
Yi-Shuo Huang, Hualien County (TW);
Yoshihiro Konishi, Hsinchu (TW)

(73) Assignee: Industrial technology Research Institute, HsinChu (TW)

( * ) Notice: Subject to any disclaimer, the term of this patent is extended or adjusted under 35 U.S.C. 154(b) by 245 days.

(21) Appl. No.: 11/675,106

(22) Filed: Feb. 15, 2007

(65) Prior Publication Data
US 2008/0129120 A1 Jun. 5, 2008

(30) Foreign Application Priority Data
Nov. 30, 2006 (TW) .............................. 95144308 A

(51) Int. Cl.
*H02J 3/00* (2006.01)
(52) U.S. Cl. .............................. 307/80; 307/44; 307/45; 307/47; 307/68; 307/72
(58) Field of Classification Search .................. 307/44, 307/45, 47, 68, 72, 80
See application file for complete search history.

(56) References Cited
U.S. PATENT DOCUMENTS

| | | | |
|---|---|---|---|
| 6,304,006 B1 | 10/2001 | Jungreis | |
| 6,804,127 B2* | 10/2004 | Zhou | 363/37 |
| 7,227,278 B2* | 6/2007 | Realmuto et al. | 307/44 |
| 7,368,890 B2* | 5/2008 | Pande et al. | 318/812 |
| 2003/0025397 A1 | 2/2003 | Young et al. | |
| 2005/0006958 A1 | 1/2005 | Dubovsky | |
| 2005/0162018 A1* | 7/2005 | Realmuto et al. | 307/44 |

\* cited by examiner

*Primary Examiner*—Albert W Paladini
*Assistant Examiner*—Hal I Kaplan
(74) *Attorney, Agent, or Firm*—WPAT, PC; Justin King

(57) ABSTRACT

A device for controlling a single-phase power conditioner for a renewable energy system is disclosed. The device comprises: a power system, providing alternating current (AC) utility power; a renewable energy system, using a natural resource so as to generate direct current (DC) power; a DC-to-DC converter, accepting the DC power generated by the renewable energy system so as to convert an input DC voltage of the DC power to an output DC voltage at a voltage level different from the DC input voltage; a grid-tied power conditioner, transforming voltage levels of the AC power and DC power; a controller, issuing a control signal for controlling the grid-tied power conditioner; and a load, consuming electricity by way of the grid-tied power conditioner.

35 Claims, 11 Drawing Sheets

DEVICE FOR CONTROLLING SINGLE-PHASE POWER CONDITIONER FOR RENEWABLE ENERGY SYSTEM

BACKGROUND OF THE INVENTION

1. Field of the Invention

The present invention generally relates to a device for controlling a single-phase power conditioner for a renewable energy system and, more particularly, to a control device for a single-phase power conditioner for a renewable energy system, thereby the renewable energy system is tied with the utility system to provide electricity when the utility system functions normally, otherwise the load consumes transferred power with negligible transfer time when one of the utility system and the renewable energy system does not provide electricity. In the present invention, the power conditioner provides better efficiency and output voltage waveform.

2. Description of the Prior Art

The distributed energy system and the renewable energy system are tied in parallel with the utility power system in practical uses. However, the load requires electricity even when the renewable energy system or the utility power system is mal-functional. Therefore, power transfer is required for the load. In order to reduce the influence of power transfer upon the load, the transfer time needs to be shortened and the swing and distortion of the output voltage of the utility power system need to be minimized.

In U.S. Patent Publication No. 20050006958 filed by Dubovsky, the transfer switch is switched to the power system, which is grid-tied with the renewable energy system, when the power system operates normally. In this grid-tied mode, the load consumes power from the power system. When the power system is mal-functional, the transfer switch is switched to the renewable energy system. In this standalone mode, the renewable energy system only provides power for some key loads such as emergency lights, life support systems and precision equipments. However, during power transfer from the grid-tied mode to the standalone mode, a surge current/voltage often occurs. Moreover, it often takes a considerable period of time for detection. And a power storage system is required for transient output power compensation.

Please also refer to U.S. Patent Publication No. 20030025397 filed by Douglas Gibbons, wherein a magnetic contactor is used for power transfer. Similar to U.S. Patent Publication No. 20050006958, it takes a considerable period of time for power transfer, wherein a surge current/voltage often occurs.

Furthermore, in U.S. Pat. No. 6,304,006 filed by M. Aaron, the load is supplied with electrical power using the standalone mode and the grid-tied mode. When the backup power system or the renewable energy system stops providing electricity, the load consumes electrical power either by way of a rectifier R1 (or a controllable rectifier system) with a filter circuit (F1), a bus and a standalone inverter or from a power storage device by way of a bus and a standalone inverter. In this patented invention, the complexity increases as the number of elements and interfaces increases. Similarly, a surge current/voltage often occurs during power transfer when the power system is mal-functional.

SUMMARY OF THE INVENTION

It is a primary object of the present invention to provide a control device for a single-phase power conditioner for a renewable energy system, thereby the renewable energy system is tied with the utility system to provide electricity when the utility system functions normally, otherwise the load consumes transferred power with negligible transfer time when one of the utility system and the renewable energy system does not provide electricity. In the present invention, the power conditioner provides better efficiency and output voltage waveform.

In order to achieve the foregoing object, the present invention provides a device for controlling a single-phase power conditioner for a renewable energy system, comprising:

a power system, providing alternating current (AC) utility power;

a renewable energy system, using a natural resource so as to generate direct current (DC) power;

a DC-to-DC converter, accepting the DC power generated by the renewable energy system so as to convert an input DC voltage of the DC power to an output DC voltage at a voltage level different from the DC input voltage;

a grid-tied power conditioner comprising a DC-to-AC inverter and an AC-to-DC converter so as to transform voltage levels of the AC power and DC power;

a controller, issuing a control signal for controlling the grid-tied power conditioner; and a load, consuming electricity by way of the grid-tied power conditioner.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

Figure 1:
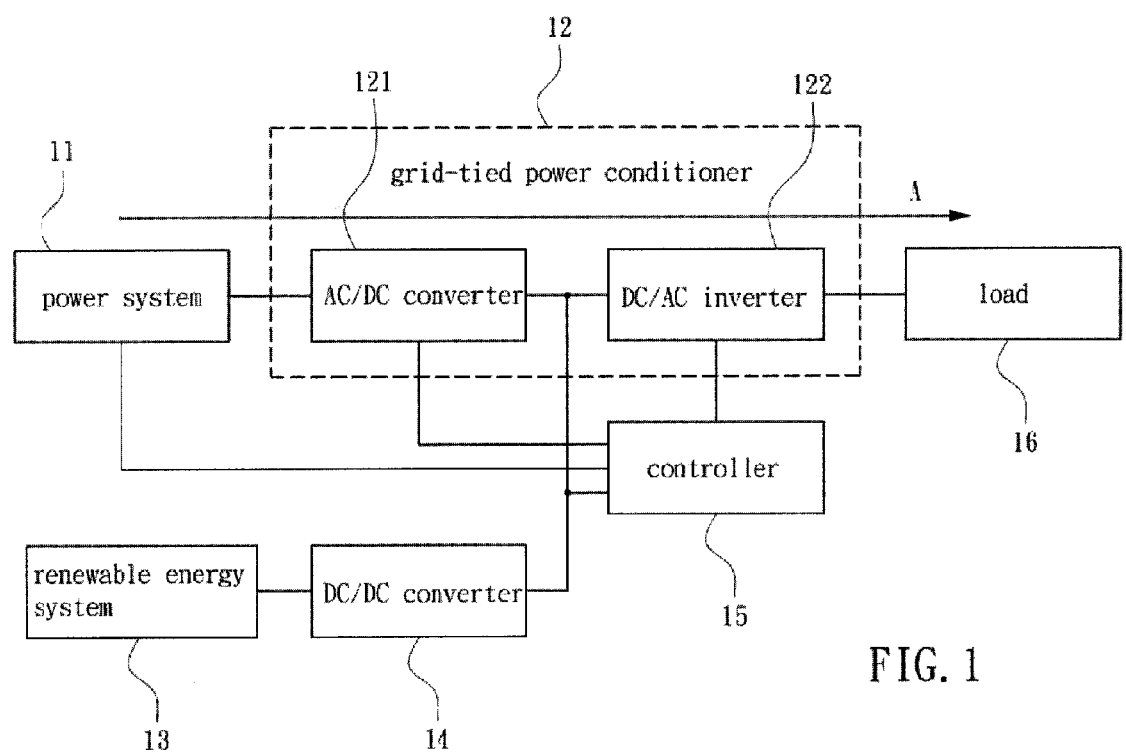
FIG. 1 shows a device for controlling a single-phase power conditioner for a renewable energy system in a first operation state according to the present invention.

The present invention providing a control device for a single-phase power conditioner for a renewable energy system can be exemplified by the preferred embodiment as described hereinafter.

Please refer to FIG. 1, FIG. 2, FIG. 3 and FIG. 4, which show a device for controlling a single-phase power conditioner for a renewable energy system in a first, a second, a third and a fourth operation states, respectively, according to the present invention. The controlling device comprises a power system 11, a renewable energy system 13, a DC-to-DC converter 14, a grid-tied power conditioner 12, a controller (also referred to as a power transfer decider) 15 and a load 16. The grid-tied power conditioner 12 is a bi-directional power conditioner and comprises a DC-to-AC inverter 122 and an AC-to-DC converter 121. The power system 11 and the renewable energy system 13 are connected in parallel to the DC link by way of the grid-tied power conditioner 12 and the DC-to-DC converter 14, respectively. The controlling device operates in four operation states, as described hereafter:

(1) In FIG. 1, the load 16 consumes electricity from the power system 11 by way of the grid-tied power conditioner 12 (along the path A) when the renewable energy system 13 does not provide electricity.

Figure 2:
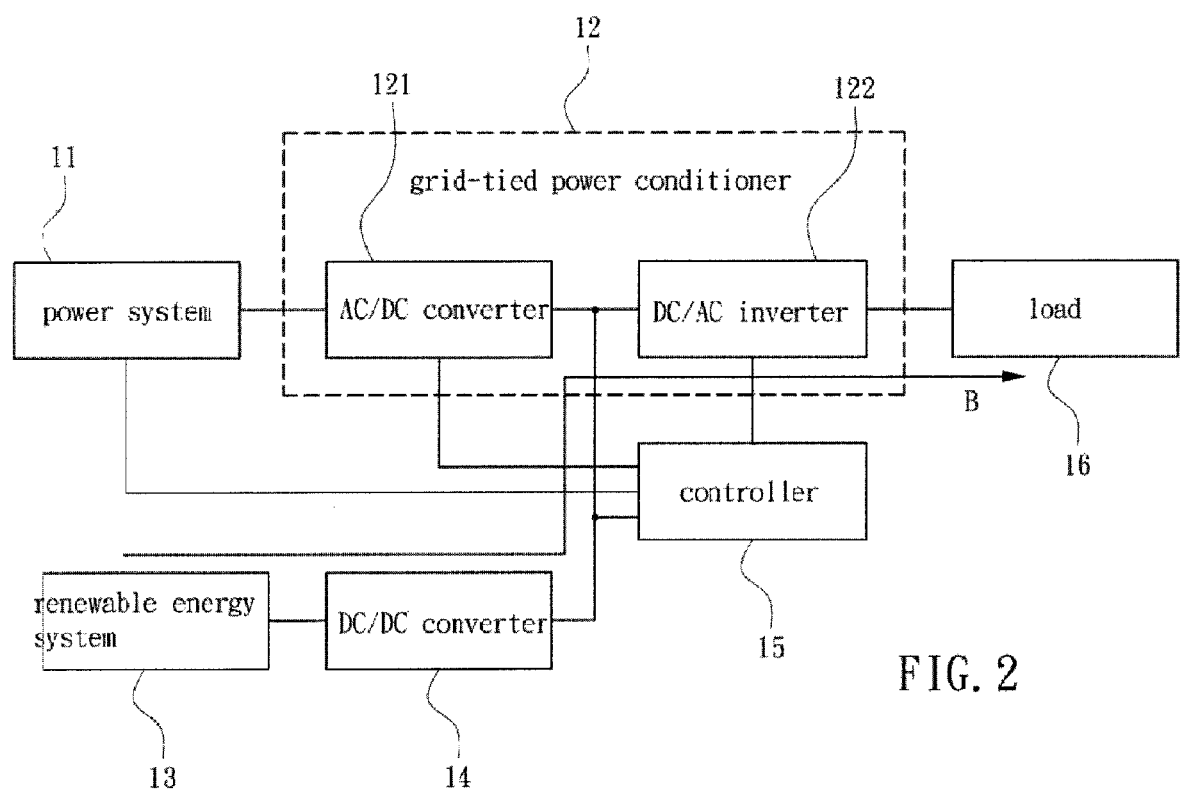
FIG. 2 shows a device for controlling a single-phase power conditioner for a renewable energy system in a second operation state according to the present invention.

(2) In FIG. 2, the load 16 consumes electricity from the renewable energy system 13 by way of the grid-tied power conditioner 12 and DC-to-DC converter 14 (along the path B) when the power system 11 does not provide electricity.

Figure 3:
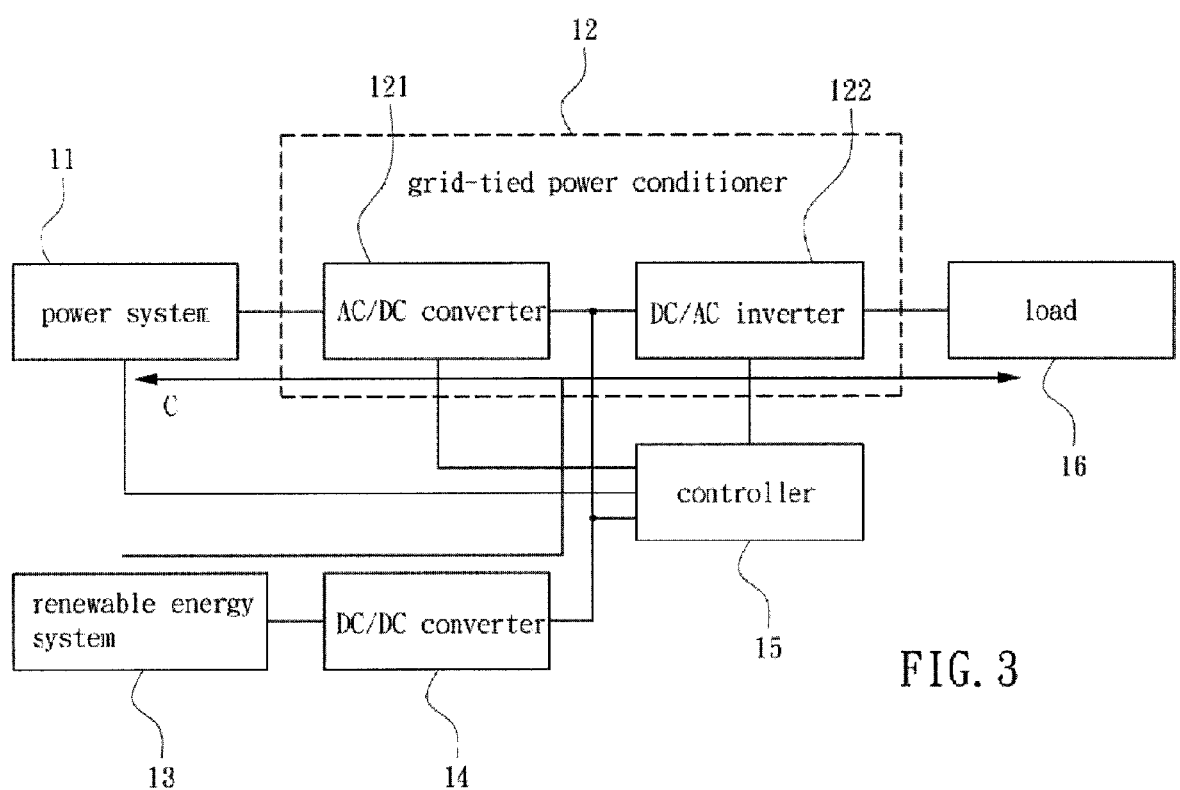
FIG. 3 shows a device for controlling a single-phase power conditioner for a renewable energy system in a third operation state according to the present invention.

(3) In FIG. 3, the load 16 consumes electricity from the renewable energy system 13 by way of the DC-to-DC converter 14 and the DC-to-AC inverter 122, and excess power is fed back to the power system 11 by way of the grid-tied power conditioner 12 (along the path C) when the renewable energy system 13 functions normally and outputs more power than the load 16 consumes.

Figure 4:
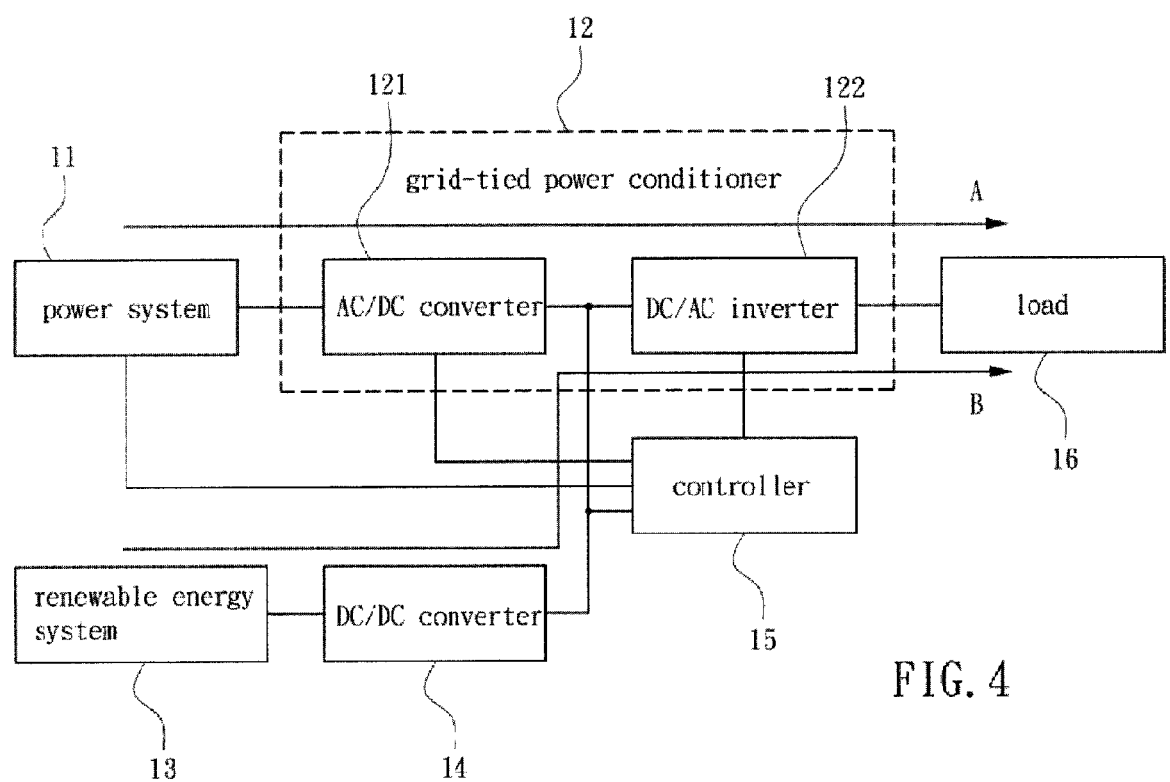
FIG. 4 shows a device for controlling a single-phase power conditioner for a renewable energy system in a fourth operation state according to the present invention.

(4) In FIG. 4, the load consumes 16 electricity partly from the renewable energy system 13 by way of the DC-to-DC converter 14 and the DC-to-AC inverter 122 and partly from the power system 11 by way of the grid-tied power conditioner 12 (along the path A) when the renewable energy system 13 outputs less power than the load consumes.

The renewable energy system uses one of hydrogen energy, solar energy, wind energy, geothermal energy, hydropower, tidal energy, ocean energy and biomass energy.

Figure 5:
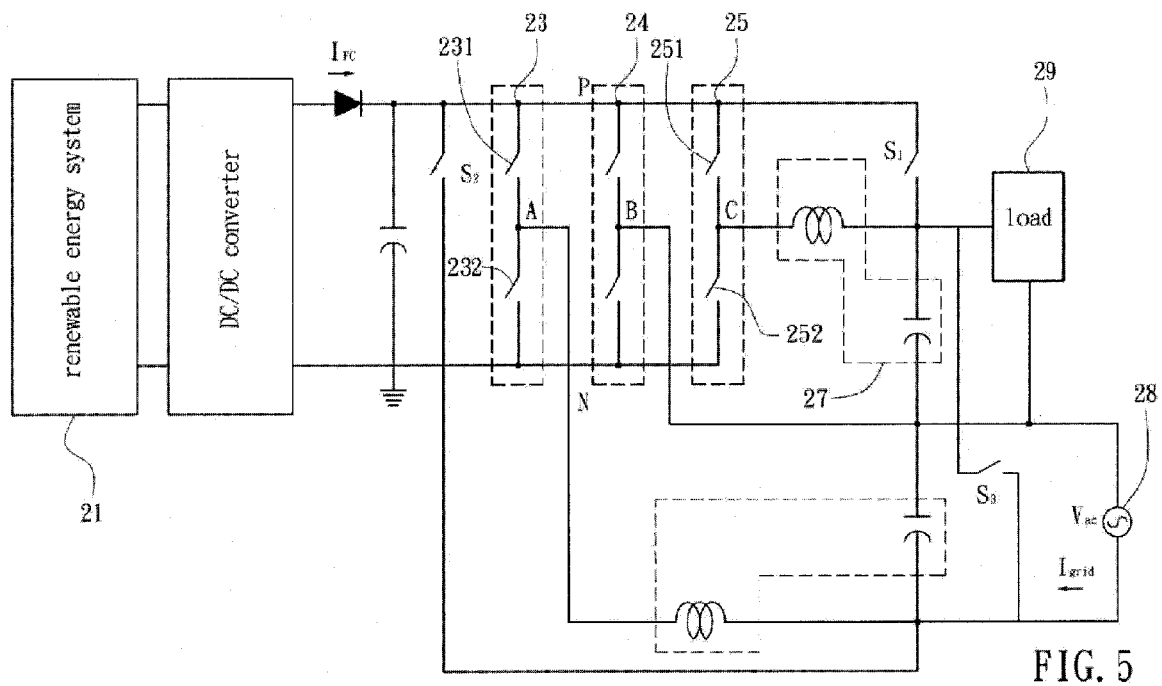
FIG. 5 is a single-phase power conditioner for a renewable energy system with no power transfer time according to the present invention.

Please refer to FIG. 5, which is a single-phase power conditioner for a renewable energy system with no power transfer time according to the present invention. The power conditioner comprises three double-switch legs, a first filter and a second filter. The three double-switch legs include a bi-directional power regulation leg 23, a common leg 24, and an inverter leg 25. The power conditioner is controlled using pulse width modulation (PWM).

Therefore, the terminal voltage of the load 29 is synchronous with the voltage waveform of the power system 28 by controlling the common leg 24 and the inverter leg 25. The bi-directional power regulation leg 23 and the common leg 24 control the DC link voltage and regulate the power flow of the load 29, the renewable energy system 21 and the power system 28. The common leg 24 is connected to the common terminal of the power system 28 and the load 29 so as to control the common voltage level of the power system 28 and the load 29. The inverter leg 25 is connected to the load 29 by way of the second filter 27 so as to control the output voltage at the load 29. The frequency of the output voltage at the load 29 is equal to the frequency of the output voltage of the power system 28. The controller 15 so as to control the bi-directional power regulation leg 23, the common leg 24, and the inverter leg 25 issues the control signal. Switches of the bi-directional power regulation leg 23 and the inverter leg 25 are controlled by pulse-width modulation (PWM). The control signal of the common leg 24 is synchronous with the output voltage of the power system 28. The control signal is output directly from the power system 28, obtained by phase-shifting or generated by the controller 15.

Figure 6:
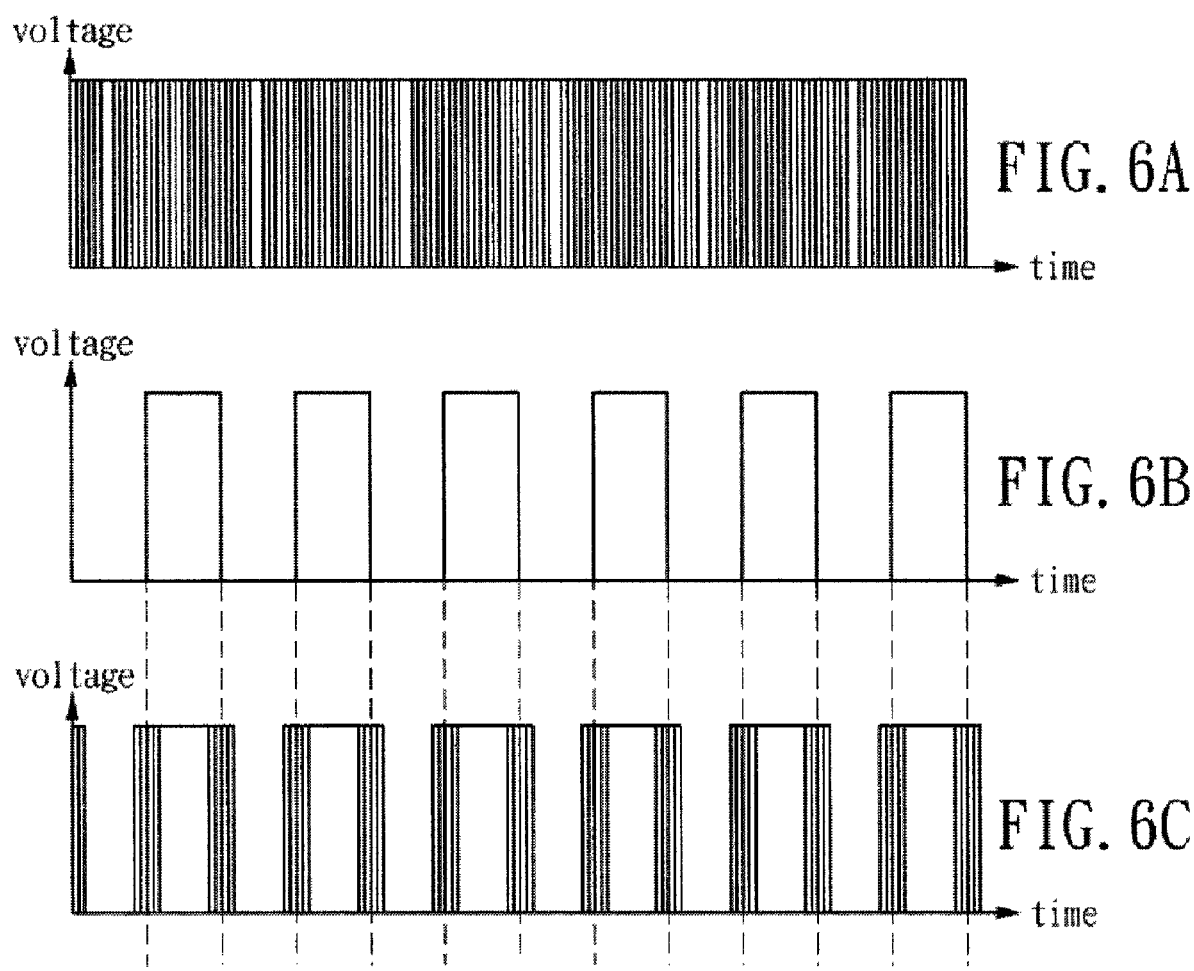
FIG. 6A shows a PWM control signal for a common leg.
FIG. 6B shows a square-wave switching signal for a common leg.
FIG. 6C shows a PWM control signal for a common leg around a zero-crossover point.

In FIG. 6A, a driving signal of the common leg is modulated by a pulse-width modulation (PWM) signal synchronous with the output voltage of the power system 28 so as to improve the output waveform.

FIG. 6B shows a square-wave switching signal for the common leg synchronous with the output voltage of the power system 28 so as to reduce the switching loss.

FIG. 6C shows a PWM control signal for a common leg around a zero-crossover point. The zero-crossover points are illustrated as the intersections of the dotted lines and a time axis. The control signal is synchronous with the output voltage of the power system 28 and is modulated around a zero-crossover point so as to better the output waveform and reduce the switching loss.

Figure 7:
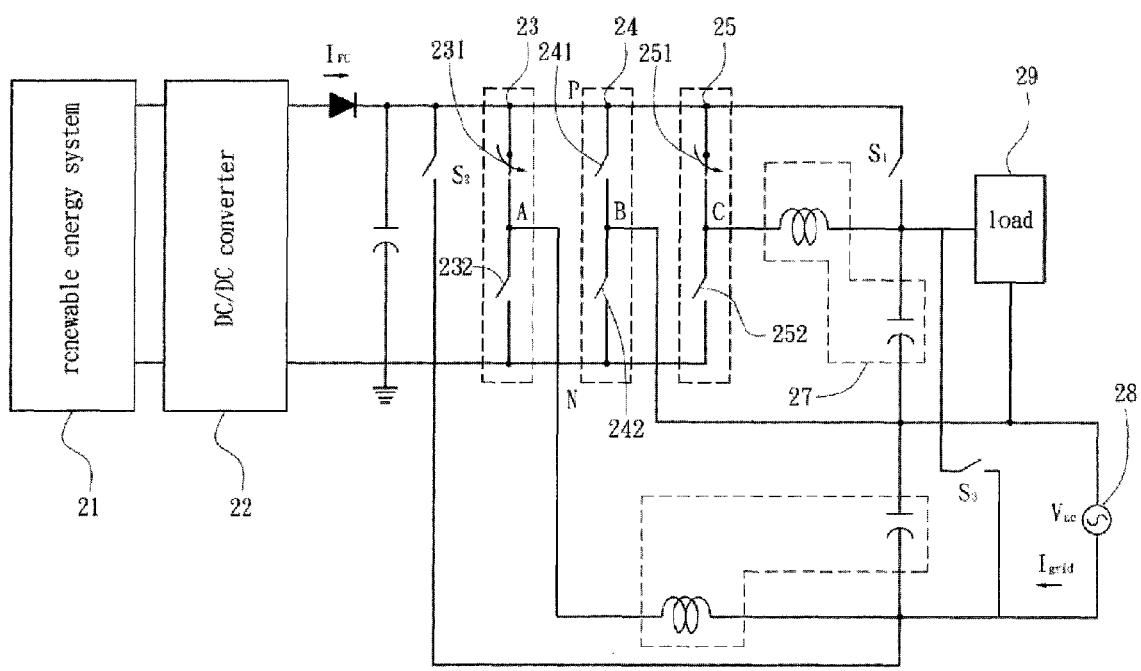
FIG. 7 shows a power conditioner comprising three double-switch legs in the first operation state according to the present invention.

In FIG. 7, the load 29 consumes electricity from the power system 28 by way of an upper switch 231 of the bi-directional power regulation leg 23 and an upper switch 251 of the inverter leg 25 when the renewable energy system 21 does not provide electricity.

Figure 8:
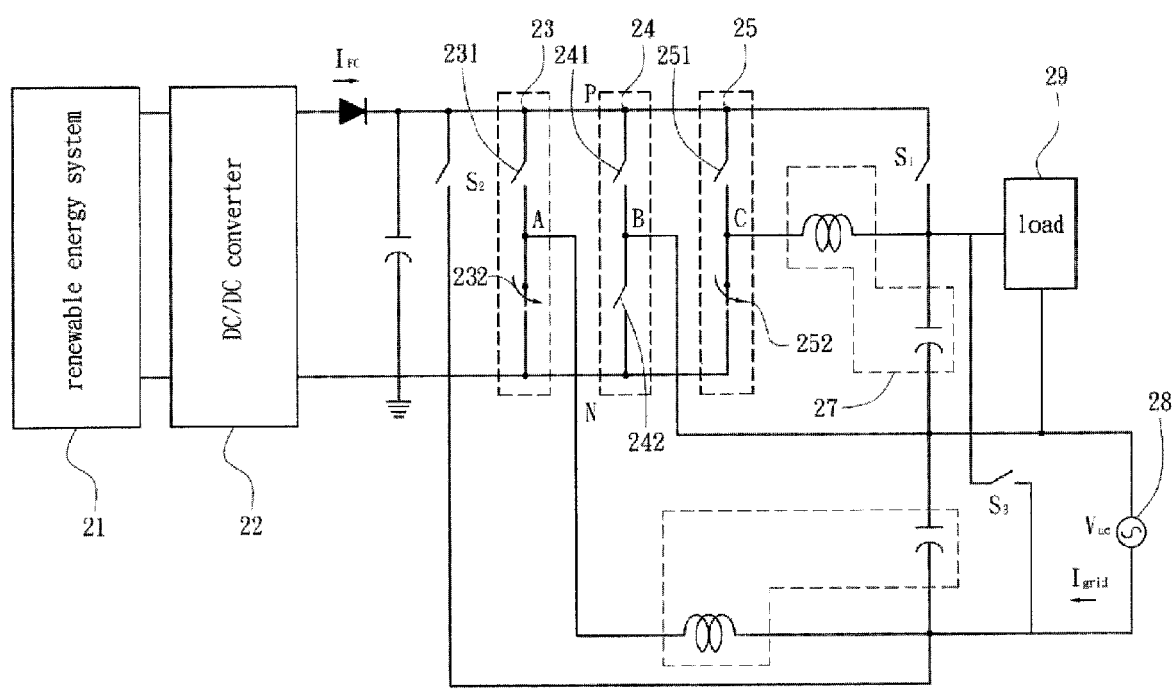
FIG. 8 shows a power conditioner comprising three double-switch legs in the first operation state according to the present invention.

In FIG. 8, the load 29 consumes electricity from the power system 28 by way of a bottom switch 232 of the bi-directional power regulation leg 23 and a bottom switch 252 of the inverter leg 25 when the renewable energy system 21 does not provide electricity.

Figure 9:
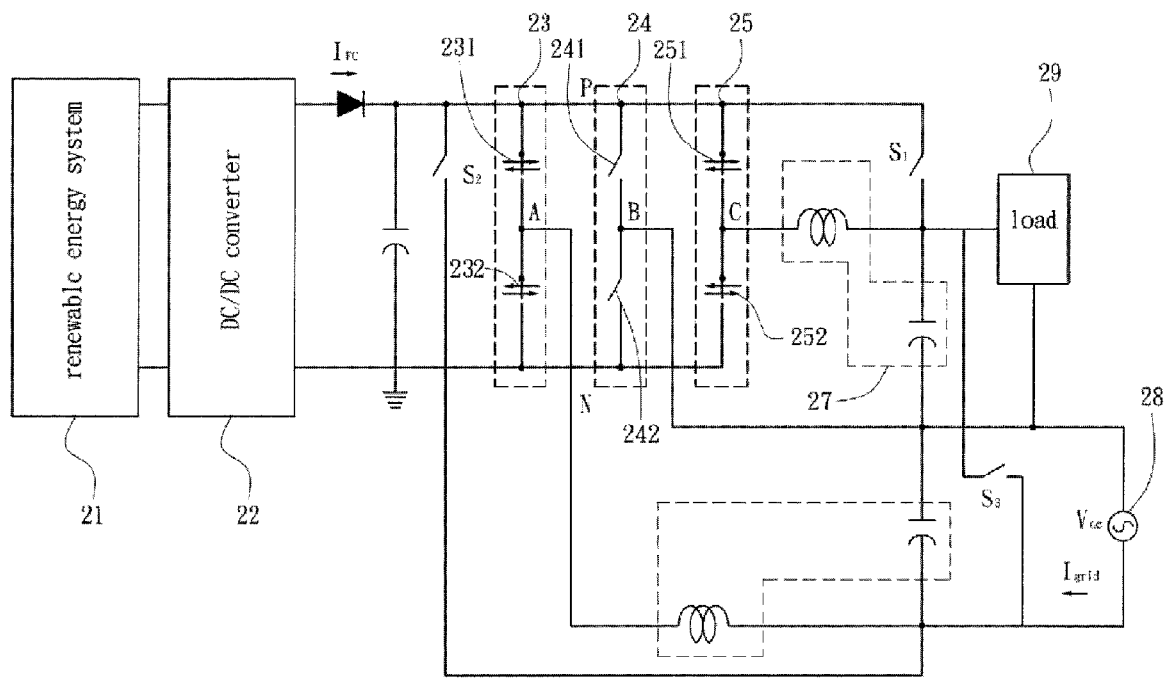
FIG. 9 shows a power conditioner comprising three double-switch legs in the first operation state according to the present invention.

In FIG. 9, the load 29 consumes electricity from the power system 28 by way of an upper switch 231 of the bi-directional power regulation leg 23 and an upper switch 251 of the inverter leg 25 and, alternately, a bottom switch 232 of the bi-directional power regulation leg 23 and a bottom switch 252 of the inverter leg 25 when the renewable energy system 21 does not provide electricity. Alternatively, said switches 231/251 and said switches 232/252 are driven by a clock $\Phi_i$ and its complimentary $\Phi_2$.

Figure 10:
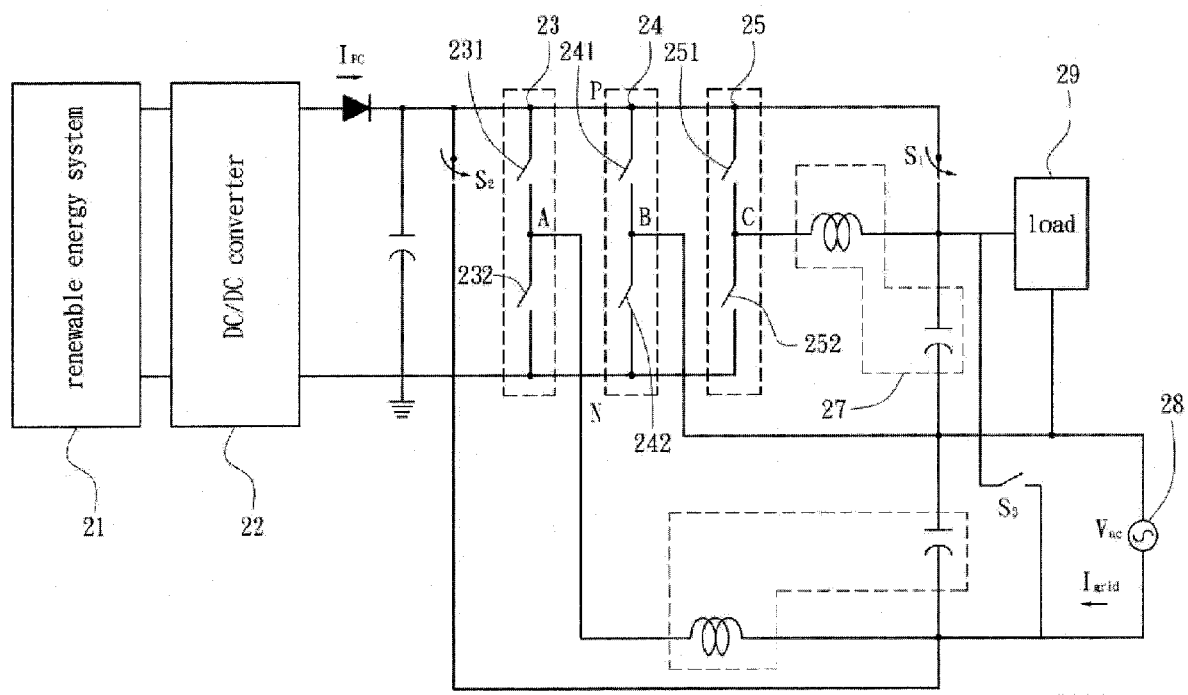
FIG. 10 shows a power conditioner comprising three double-switch legs with additional switches in the first operation state according to the present invention.

In FIG. 10, the grid-tied power conditioner comprises a bi-directional power regulation leg 23, a common leg 24, an inverter leg 25, a first filter 26, a second filter 27 and a first switch S1, a second switch S2 and a third switch S3. The load 29 consumes electricity from the power system 28 by way of the first switch S1 and the second switch S2 when the renewable energy system 21 does not provide electricity.

Figure 11:
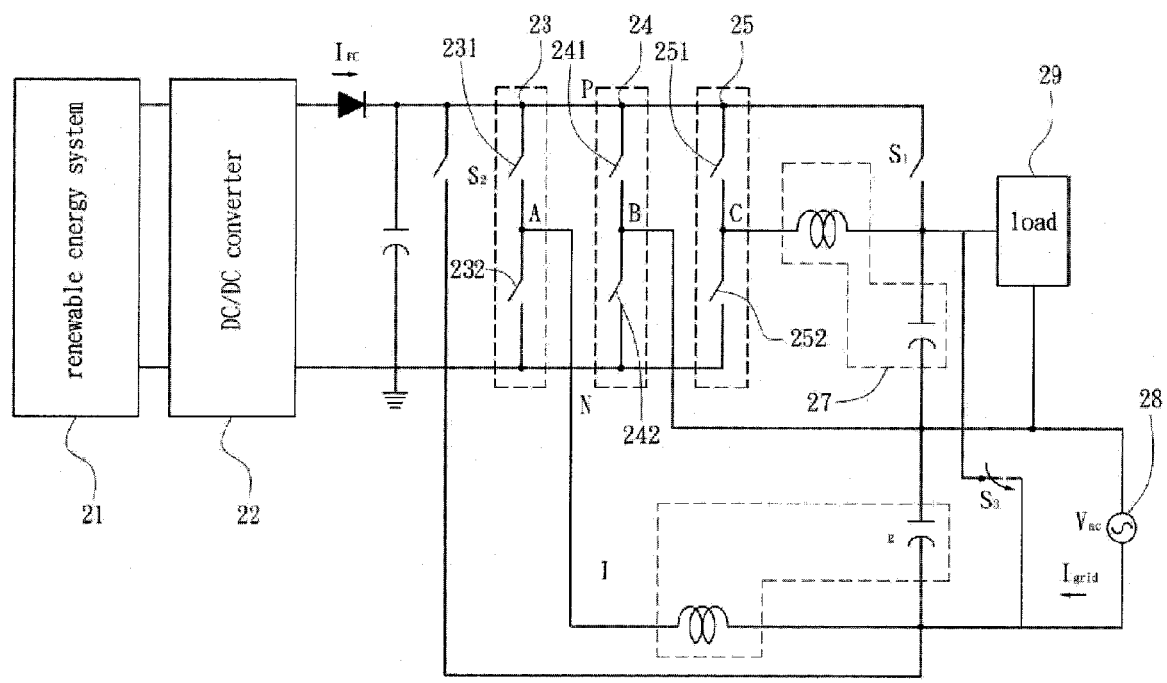
FIG. 11 shows a power conditioner comprising three double-switch legs with additional switches in the first operation state according to the present invention.

In FIG. 11, the load 29 consumes electricity from the power system 28 by way of the third switch S3 when the renewable energy system 21 does not provide electricity.

In the disclosure according to FIG. 1 to FIG. 11, it is apparent that the present invention discloses a control device for a single-phase power conditioner for a renewable energy system, thereby the renewable energy system is tied with the utility system to provide electricity when the utility system functions normally, otherwise the load consumes transferred power with negligible transfer time when one of the utility system and the renewable energy system does not provide electricity. In the present invention, the power conditioner provides better efficiency and output voltage waveform. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A device for controlling a single-phase power conditioner for a renewable energy system, comprising:
   a power system, providing alternating current (AC) utility power;
   a renewable energy system, using a natural resource so as to generate direct current (DC) power;
   a DC-to-DC converter, accepting the DC power generated by the renewable energy system so as to convert an input DC voltage of the DC power to an output DC voltage at a voltage level different from the DC input voltage;
   a grid-tied power conditioner comprising a DC-to-AC inverter and an AC-to-DC converter so as to transform voltage levels of the AC power and DC power;
   a controller, issuing a control signal, synchronous with the output voltage of the power system, for controlling the grid-tied power conditioner; and
   a load, consuming electricity by way of the grid-tied power conditioner; wherein the grid-tied power conditioner comprises a bi-directional power regulation leg, a common leg, an inverter leg, a first filter and a second filter; and wherein, the controller further modulates the control signal for the common leg by a pulse-width modulation signal or by a rectangular-wave signal so as to reduce the switching loss.

2. The device for controlling a single-phase power conditioner for a renewable energy system as recited in claim 1, wherein the renewable energy system uses one of hydrogen energy, solar energy, wind energy, geothermal energy, hydropower, tidal energy, ocean energy and biomass energy.

3. The device for controlling a single-phase power conditioner for a renewable energy system as recited in claim 1, wherein the load consumes electricity from the power system by way of the grid-tied power conditioner when the renewable energy system does not provide electricity.

4. The device for controlling a single-phase power conditioner for a renewable energy system as recited in claim 1, wherein the load consumes electricity from the renewable energy system by way of the DC-to-DC converter and the DC-to-AC inverter when the power system does not provide electricity.

5. The device for controlling a single-phase power conditioner for a renewable energy system as recited in claim 1, wherein the load consumes electricity from the renewable energy system by way of the DC-to-DC converter and the DC-to-AC inverter, and excess power is fed back to the power system by way of the AC-to-DC converter when the renewable energy system functions normally and outputs more power than the load consumes.

6. The device for controlling a single-phase power conditioner for a renewable energy system as recited in claim 1, wherein the load consumes electricity partly from the renewable energy system by way of the DC-to-DC converter and the DC-to-AC inverter and partly from the power system by way of the grid-tied power conditioner when the renewable energy system outputs less power than the load consumes.

7. The device for controlling a single-phase power conditioner for a renewable energy system as recited in claim 1, wherein the bi-directional power regulation leg is connected to the power system by way of the first filter so as to control the DC link voltage and the power flow.

8. The device for controlling a single-phase power conditioner for a renewable energy system as recited in claim 1, wherein the common leg is connected to a common terminal of the power system and the load so as to control the voltage level at the common terminal of the power system and the load.

9. The device for controlling a single-phase power conditioner for a renewable energy system as recited in claim 1, wherein the inverter leg is connected to the load by way of the second filter so as to control the output voltage at the load, the frequency of the output voltage at the load being equal to the frequency of the output voltage of the power system.

10. The device for controlling a single-phase power conditioner for a renewable energy system as recited in claim 1, wherein the control signal is issued by the controller so as to control the bi-directional power regulation leg, the common leg, and the inverter leg.

11. The device for controlling a single-phase power conditioner for a renewable energy system as recited in claim 1, wherein switches of the bi-directional power regulation leg and inverter leg are controlled by pulse-width modulation (PWM).

12. The device for controlling a single-phase power conditioner for a renewable energy system as recited in claim 1, wherein the load consumes electricity from the power system by way of an upper switch of the bi-directional power regulation leg and an upper switch of the inverter leg when the renewable energy system does not provide electricity.

13. The device for controlling a single-phase power conditioner for a renewable energy system as recited in claim 1, wherein the load consumes electricity from the power system by way of a bottom switch of the bi-directional power regulation leg and a bottom switch of the inverter leg when the renewable energy system does not provide electricity.

14. The device for controlling a single-phase power conditioner for a renewable energy system as recited in claim 1, wherein the load consumes electricity from the power system by way of an upper switch of the bi-directional power regulation leg and an upper switch of the inverter leg and, alternately, a bottom switch of the bi-directional power regulation leg and a bottom switch of the inverter leg when the renewable energy system does not provide electricity.

15. The device for controlling a single-phase power conditioner for a renewable energy system as recited in claim 1, wherein the grid-tied power conditioner comprises a bi-directional power regulation leg, a common leg, an inverter leg, a first filter, a second filter and a first switch, a second switch and a third switch.

16. The device for controlling a single-phase power conditioner for a renewable energy system as recited in claim 15, wherein the load consumes electricity from the power system by way of the first switch and the second switch when the renewable energy system does not provide electricity.

17. The device for controlling a single-phase power conditioner for a renewable energy system as recited in claim 15, wherein the load consumes electricity from the power system by way of the third switch when the renewable energy system does not provide electricity.

18. A device for controlling a single-phase power conditioner for a renewable energy system, comprising:
   a power system, providing alternating current (AC) utility power;
   a renewable energy system, using a natural resource so as to generate direct current (DC) power;

a DC-to-DC converter, accepting the DC power generated by the renewable energy system so as to convert an input DC voltage of the DC power to an output DC voltage at a voltage level different from the DC input voltage;

a grid-tied power conditioner comprising a DC-to-AC inverter and an AC-to-DC converter so as to transform voltage levels of the AC power and DC power;

a controller, issuing a control signal, synchronous with the output voltage of the power system, for controlling the grid-tied power conditioner; and a load, consuming electricity by way of the grid-tied power conditioner; wherein the grid-tied power conditioner comprises a bi-directional power regulation leg, a common leg, an inverter leg, a first filter and a second filter; wherein, the controller further modulates the control signal by pulse-width modulation around zero-crossing points so as to reduce the switching loss.

19. The device for controlling a single-phase power conditioner for a renewable energy system as recited in claim 18, wherein the renewable energy system uses one of hydrogen energy, solar energy, wind energy, geothermal energy, hydropower, tidal energy, ocean energy and biomass energy.

20. The device for controlling a single-phase power conditioner for a renewable energy system as recited in claim 18, wherein the load consumes electricity from the power system by way of the grid-tied power conditioner when the renewable energy system does not provide electricity.

21. The device for controlling a single-phase power conditioner for a renewable energy system as recited in claim 18, wherein the load consumes electricity from the renewable energy system by way of the DC-to-DC converter and the DC-to-AC inverter when the power system does not provide electricity.

22. The device for controlling a single-phase power conditioner for a renewable energy system as recited in claim 18, wherein the load consumes electricity from the renewable energy system by way of the DC-to-DC converter and the DC-to-AC inverter, and excess power is fed back to the power system by way of the AC-to-DC converter when the renewable energy system functions normally and outputs more power than the load consumes.

23. The device for controlling a single-phase power conditioner for a renewable energy system as recited in claim 18, wherein the load consumes electricity partly from the renewable energy system by way of the DC-to-DC converter and the DC-to-AC inverter and partly from the power system by way of the grid-tied power conditioner when the renewable energy system outputs less power than the load consumes.

24. The device for controlling a single-phase power conditioner for a renewable energy system as recited in claim 18, wherein the grid-tied power conditioner comprises a bi-directional power regulation leg, a common leg, an inverter leg, a first filter and a second filter.

25. The device for controlling a single-phase power conditioner for a renewable energy system as recited in claim 18, wherein the bi-directional power regulation leg is connected to the power system by way of the first filter so as to control the DC link voltage and the power flow.

26. The device for controlling a single-phase power conditioner for a renewable energy system as recited in claim 18, wherein the common leg is connected to a common terminal of the power system and the load so as to control the voltage level at the common terminal of the power system and the load.

27. The device for controlling a single-phase power conditioner for a renewable energy system as recited in claim 18, wherein the inverter leg is connected to the load by way of the second filter so as to control the output voltage at the load, the frequency of the output voltage at the load being equal to the frequency of the output voltage of the power system.

28. The device for controlling a single-phase power conditioner for a renewable energy system as recited in claim 18, wherein the control signal is issued by the controller so as to control the bi-directional power regulation leg, the common leg, and the inverter leg.

29. The device for controlling a single-phase power conditioner for a renewable energy system as recited in claim 18, wherein switches of the bi-directional power regulation leg and inverter leg are controlled by pulse-width modulation (PWM).

30. The device for controlling a single-phase power conditioner for a renewable energy system as recited in claim 18, wherein the load consumes electricity from the power system by way of an upper switch of the bi-directional power regulation leg and an upper switch of the inverter leg when the renewable energy system does not provide electricity.

31. The device for controlling a single-phase power conditioner for a renewable energy system as recited in claim 18, wherein the load consumes electricity from the power system by way of a bottom switch of the bi-directional power regulation leg and a bottom switch of the inverter leg when the renewable energy system does not provide electricity.

32. The device for controlling a single-phase power conditioner for a renewable energy system as recited in claim 18, wherein the load consumes electricity from the power system by way of an upper switch of the bi-directional power regulation leg and an upper switch of the inverter leg and, alternately, a bottom switch of the bi-directional power regulation leg and a bottom switch of the inverter leg when the renewable energy system does not provide electricity.

33. The device for controlling a single-phase power conditioner for a renewable energy system as recited in claim 18, wherein the grid-tied power conditioner comprises a bi-directional power regulation leg, a common leg, an inverter leg, a first filter, a second filter and a first switch, a second switch and a third switch.

34. The device for controlling a single-phase power conditioner for a renewable energy system as recited in claim 33, wherein the load consumes electricity from the power system by way of the first switch and the second switch when the renewable energy system does not provide electricity.

35. The device for controlling a single-phase power conditioner for a renewable energy system as recited in claim 33, wherein the load consumes electricity from the power system by way of the third switch when the renewable energy system does not provide electricity.

* * * * *